US012719158B2

(12) United States Patent
Jo

(10) Patent No.: US 12,719,158 B2
(45) Date of Patent: Aug. 25, 2026

(54) ARTIFICIAL INTELLIGENCE EMPOWERED MULTI-LAYER COUPLING-CONTROLLED ANTENNA SYSTEM

(71) Applicant: SkyMirr, Inc., Melbourne, FL (US)

(72) Inventor: Youngmin Jo, Melbourne, FL (US)

(73) Assignee: SKYMIRR, INC., Melbourne, FL (US)

( * ) Notice: Subject to any disclaimer, the term of this patent is extended or adjusted under 35 U.S.C. 154(b) by 120 days.

(21) Appl. No.: 18/908,282

(22) Filed: Oct. 7, 2024

(65) Prior Publication Data

US 2025/0300345 A1 Sep. 25, 2025

Related U.S. Application Data

(60) Provisional application No. 63/542,997, filed on Oct. 6, 2023.

(51) Int. Cl.
*H01Q 1/52* (2006.01)
*H01Q 9/20* (2006.01)

(52) U.S. Cl.
CPC ............... *H01Q 1/521* (2013.01); *H01Q 9/20* (2013.01)

(58) Field of Classification Search
CPC ............. H01Q 1/52; H01Q 1/521; H01Q 9/20
See application file for complete search history.

(56) References Cited

U.S. PATENT DOCUMENTS

2021/0111486 A1* 4/2021 Tamrakar ................. H01Q 9/42
2022/0326313 A1* 10/2022 Kim ....................... G01R 31/55

FOREIGN PATENT DOCUMENTS

KR 20230059353 A * 5/2023 ............... H01Q 1/24
WO WO-2022177278 A1 * 8/2022 ............. H04B 1/401

* cited by examiner

*Primary Examiner* — Hoang V Nguyen
(74) *Attorney, Agent, or Firm* — John L. DeAngelis; Wolter Van Dyke Davis, PLLC

(57) ABSTRACT

An antenna system. The system comprises first and second spaced-apart antennas each one formed in an upper conductive layer and a lower conductive layer of a printed circuit board. Coupling structures (four coupling structures in one embodiment) disposed between the first and second antennas are formed in either the upper conductive layer or the lower conductive layer and conductively connected to one of the first antenna or the second antenna. The coupling structures formed in the upper conductive layer overlie those formed in the lower conductive layer. The direction of current flow in the coupling structures reduces interference between the electromagnetic fields radiated from the first and the second antennas.

20 Claims, 9 Drawing Sheets

ARTIFICIAL INTELLIGENCE EMPOWERED MULTI-LAYER COUPLING-CONTROLLED ANTENNA SYSTEM

CROSS REFERENCE TO RELATED APPLICATIONS

The present invention claims priority under 35 U.S.C. 119(e) to the provisional patent application filed on Oct. 6, 2023 and assigned application No. 63/542,997. This provisional patent application is incorporated in its entirety herein.

FIELD OF THE INVENTION

The present invention relates to multi-layer coupling-controlled antenna systems with improved antenna performance by reducing negative coupling that degrades performance of closely-spaced antennas of the antenna system.

BACKGROUND OF THE INVENTION

Printed Circuit Board (PCB) antennas are popular due to their small size, affordability, and ease of integration into various electronic devices. They utilize the conductive traces and components on the PCB substrate. PCB antennas offer portability by occupying minimal space on the PCB, making them suitable for compact devices. They eliminate the need for external antennas, simplifying the device's design. Another advantage is their low cost, as they can be directly fabricated onto the PCB without the use of additional materials. These important features make PCB antennas suitable for mass production, especially in compact Internet of Things (IoT) devices that transmit and receive information via the antenna(s).

The Internet of Things (IoT) connects devices worldwide, creating smarter homes, cities, and industries. However, a key component enabling these connections is the IoT antenna(s). Given the relatively small size of IoT devices, the antennas within the IoT device are typically compact and closely spaced. The physical placement of the antennas may lead to enhanced mutual coupling, decrease in radiation efficiency and functional deterioration of the system in which the IoT device operates.

The antenna in an IoT device (also referred to as an IoT antenna) enables wireless communication between IoT devices and with a base station. Like any antenna, it converts electrical signals into radio waves and vice versa, allowing IoT devices to connect to various communication networks without physical wiring.

IoT antennas come in many forms and operate at different frequencies, tailored to specific applications and environments. Printed circuit board mounted antennas are particularly popular because they are compact and easily fabricated. In any case, the antenna is designed to efficiently radiate and receive the radio waves to establish wireless communication between IoT devices. The IoT antenna operates in conjunction with a transceiver that extracts information from the received signal and provides the information to the antenna for transmitting.

The performance of an IoT antenna is determined by various factors, such as its design, size, shape, and placement within the IoT device. Available space, in particular, poses a challenge to good antenna design and performance. These factors affect the antenna's ability to radiate and capture electromagnetic waves efficiently, as well as the antenna range and quality of the received and transmitted signals.

Dipole antennas are commonly used in IoT devices because they are simple, easy to install, operate effectively with multiple wireless technologies (e.g., Bluetooth, Zigbee, WiFi) and their radiation pattern is omnidirectional, that is, radiating in all directions, which is advantageous if the location of the receiving device is unknown.

The operational frequency of a dipole antenna is determined by its length and therefore the usable frequency bandwidth is somewhat limited, requiring different antenna lengths for different frequency bands.

A typical dipole antenna comprises a pair of parallel and symmetrical metallic conductors, usually linear conductors. These two conductors are often called "dipoles" and their length is usually a half wavelength at the operational frequency, that is, a half-wave dipole. In certain applications, multiple half-wave dipole antenna are used for transmitting and receiving a signal.

In an IoT device, given space constraints, the dipoles are closely spaced, creating problematic coupling-based issues (sometimes referred to as negative coupling) between the antennas, including: interference between the signals transmitted or received from each antenna, one antenna affecting the radiated power of the other proximate antenna(s), (which leads to distortion, noise, and reduced signal power and signal range), polarization coupling losses due to a polarization mismatch between the antennas, and corruption of the information carried by the transmitted or received signal.

A maximum coupling loss (MCL) metric represents the maximum loss that can be tolerated for an operational system. Of course, a higher MCL suggests a more robust link between receiver and transmitter.

Simply separating the antennas, that is, increasing a distance between the antennas, can reduce coupling and its attendant problems, but this separation increase limits design flexibility and increases the size of the operating device, which is typically not desired. More elaborate isolation techniques are also known in the art.

FIG. 1 illustrates a dipole antenna 12A/12B (separated by a feed point 40) and a dipole 14A/14B (separated by a feed point 42) disposed in closely-spaced arrangement on a substrate 15 (e.g., a printed circuit board). The close spacing of the antennas induces coupling issues as described above. A coordinate system comprising X, Y, and Z axes is also depicted.

As shown, each dipole antenna comprises two separate conductive metal elements. Each element is connected to a transmission line (not shown), providing a signal feed (a current source or a voltage source).

FIG. 2 graphically depicts port performance parameters ($S_{11}$ and $S_{21}$) as a function of frequency for the dipole antennas 12A/12B and 14A/14B.

The $S_{21}$ parameter curve depicts the signal that input to dipole antenna 12A/12B (referred to as antenna 1 or port 1) and output from dipole antenna 14A/14B (referred to as antenna 2 or port 2). FIG. 2 also illustrates a reflection parameter $S_{11}$ that indicates the signal power input to dipole antenna 12A/12B (or port 1) and output from dipole antenna 12A/12B. Note that an S-parameter with the same numerical subscripts, such as $S_{11}$, indicates signal reflection measurements, while an S-parameter with different numerical subscripts, like $S_{21}$, indicates signal transmission measurements. The second numerical value in the subscript indicates an input port and the first numerical value indicates an output port.

With continuing reference to FIG. 2, at a resonant frequency (indicated by a vertical line 25) the $S_{21}$ parameter peaks at about −5 dB, which is generally greater than a desired interference between two antennas. Note that a high interference value between two antennas (such as antennas 12A/12B and 14A/14B) is indicative of low isolation between the two antennas and the attendant problems described above in the background section. Thus a low isolation value between two antennas is not desired in wireless communications systems; here the unacceptable isolation is due to unwanted coupling between the antennas 12A/12B and 14A/14B, in particular, because they are closely-spaced, as in an IoT device.

The $S_{11}$ indicates the energy supplied to port 1 (either antenna 12A/12B or the antenna 14A/14B) and returned/reflected back to the same port, also referred to as the internal reflection coefficient. The $S_{11}$ parameter is not related to antenna coupling nor indicative of coupling performance.

DETAILED DESCRIPTION OF THE INVENTION

Figure 1:
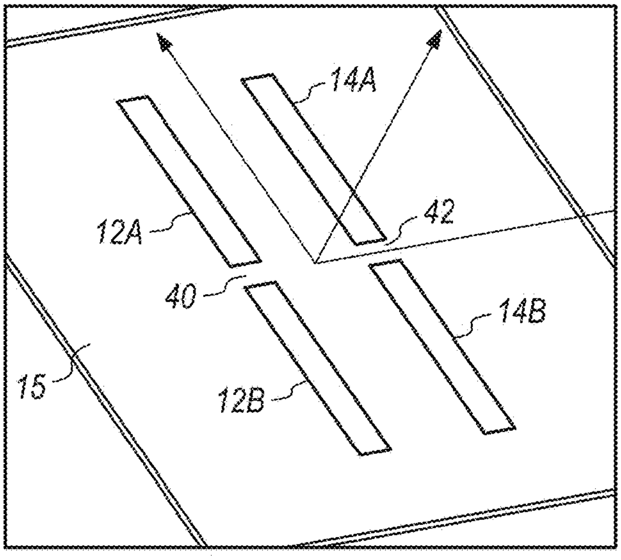
FIG. 1 (Prior Art)
FIG. 1 illustrates two prior art dipole antennas disposed in a parallel configuration.

Unless defined otherwise, all technical and scientific terms used herein have the same meaning as commonly understood by one of ordinary skill in the art to which this invention pertains. Although any methods and materials similar or equivalent to those described herein can be used in the practice or testing of the invention, the preferred methods and materials are now described. All publications mentioned herein are incorporated herein by reference.

The terms "about" or "approximately" as used herein when referring to a measurable value such as a parameter, an amount, a temporal duration, and the like, are meant to encompass variations of and from the specified value, such as variations of +/−10% or less, +/−5% or less, +/−1% or less, and +/−0.1% or less of and from the specified value, insofar such variations are appropriate to perform in the disclosed invention. It is to be understood that the value to which the modifier "about" or "approximately" refers is itself also specifically, and preferably, disclosed.

Reference throughout this specification to "one embodiment", "an embodiment," "an example embodiment," means that a particular feature, structure, or characteristic described in connection with the embodiment is included in at least one embodiment of the present invention. Thus, appearances of the phrases "in one embodiment," "in an embodiment," or "an example embodiment" in various places throughout this specification are not necessarily all referring to the same embodiment but may.

Furthermore, the features, structures or characteristics may be combined in any suitable manner, as would be apparent to a person skilled in the art of this disclosure, in one or more embodiments. Furthermore, while some embodiments described herein include some, but not other features included in other embodiments, combinations of features of different embodiments are meant to be within the scope of the invention. For example, in the appended claims, any of the claimed embodiments can be used in any combination.

Implementation of the technology of the present invention can improve antenna performance significantly by improving the mutual coupling/mutual radiation between the antenna components of the communicating devices. Thus, the various disclosed antennas may be referred to as multilayer coupling controlled antennas (MulCAT antennas).

To reduce the coupling-induced problems created by locating a dipole antenna 12 (comprising elements 12A and 12B separated by a gap 40) (see FIG. 3) and a dipole antenna 14 (comprising dipole elements 14A and 14B separated by a gap 42) in proximate relationship, the present invention discloses the addition of four (in one embodiment) coupling structures 31, 41, 38, and 48 disposed between the two dipole antennas 12 and 14.

Figure 18B:
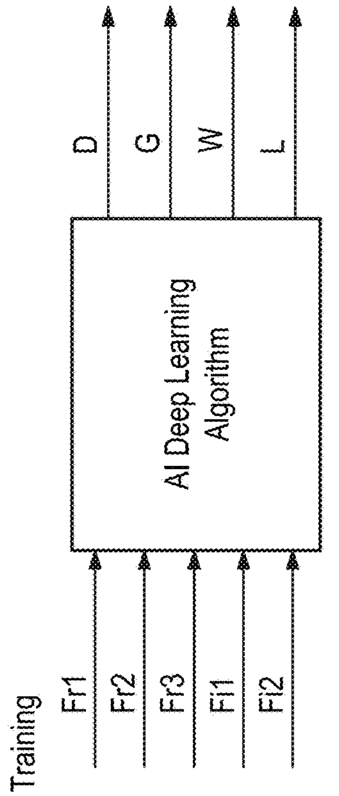
FIGS. 18A, 18B, and 18C illustrate block diagrams for training an artificial intelligence system for determining the parameters of FIG. 12 and for using the artificial intelligence system after the training.
Figure 18A:
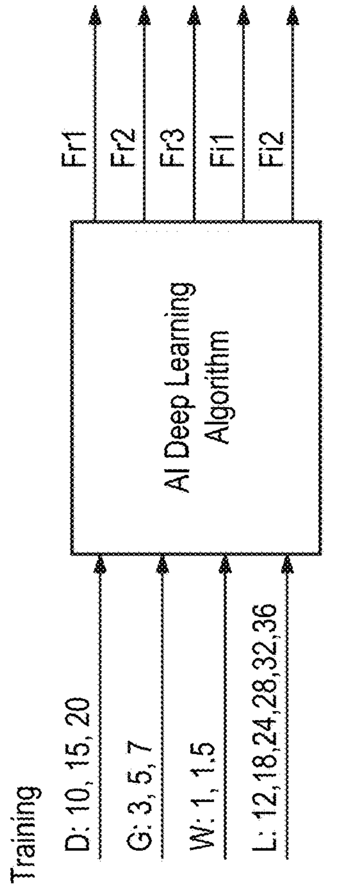
Figure 18C:
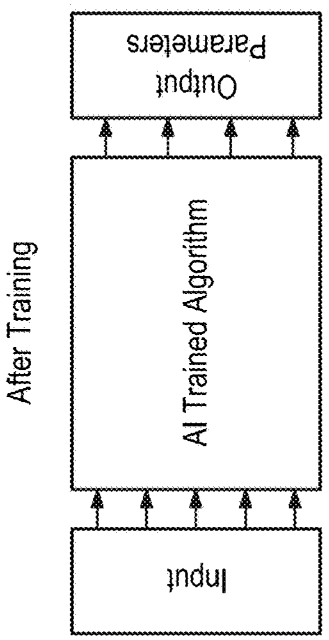

The coupling structures are designed to generate electromagnetic fields that are added or combined with the radiated fields from the dipole antennas to remove field interferences, resulting in better isolation performance of the antennas across the frequency spectrum of interest. Details of the coupling structures are based on dipole antenna parameters such as length, width, location of the coupling structure, and the distance between the two dipole radiators. In one embodiment those details are determined by an AI/ML-based (artificial intelligence/machine learning) algorithm suitably trained as illustrated in FIGS. 18A and 18B and then executed (FIG. 18C). During the execution phase, certain parameters of the coupling structures are determined responsive to input frequencies or frequency values are determined when certain coupling structure parameter values are input.

Figure 3:
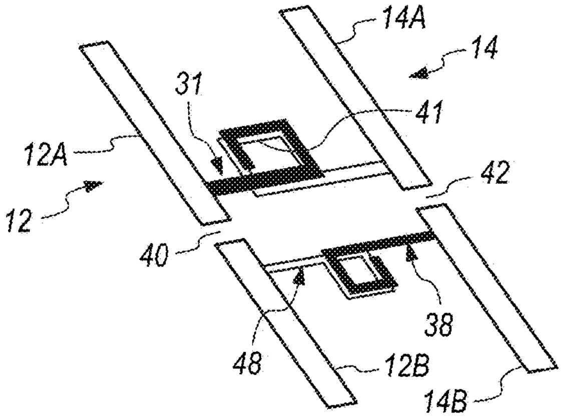
FIG. 3 illustrates two dipole antennas with a coupling structure according to the present invention.

As also shown in FIG. 3, the coupling structure 31 is conductively connected to the dipole element 12A and extends toward the dipole element 14A. The coupling structure 41 is conductively connected to the dipole element 14A and extends toward the dipole element 12A.

Coupling structure 38 is conductively connected to the dipole element 14B and extends toward the dipole element 12B. Coupling structure 48 is conductively connected to the dipole element 12B and extends toward the dipole element 14B.

Figure 5:
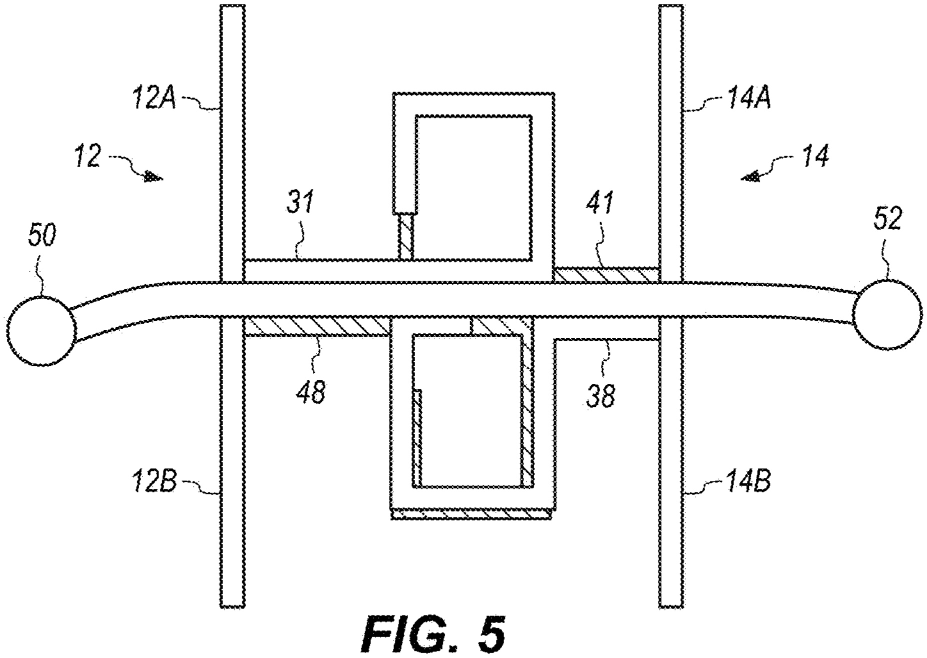
FIGS. 5 and 6 illustrate a top and partial side view of the dipole elements and novel coupling structures of the present invention.

The dipole elements and the coupling structures are shown in more detail in FIG. 5. Since a portion of the coupling structure 31 overlies a portion of the coupling structure 41, the entire coupling structure 41 is not visible in FIG. 5. Similarly, since a portion of the coupling structure 38 overlies a portion of the coupling structure 48, the entire coupling structure 48 is not visible in FIG. 5.

Figure 4:
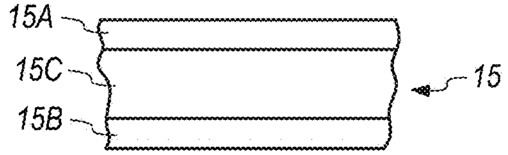
FIG. 4 illustrates a printed circuit board on which the elements of the invention are formed or mounted.

The coupling structures 31 and 41 are formed in a printed circuit board, such as a printed circuit board 15 depicted in FIG. 4. Specifically, the conductive structure 31 is formed in an upper conductive layer 15A and the coupling structure 41 is formed in a lower conductive layer 15B. The printed circuit board 15 further comprises a middle-insulated structure 15C shown in FIG. 4.

The coupling structures 38 and 48 are formed in the printed circuit board 15 of FIG. 4. Specifically, the coupling structure 38 is formed in the upper conductive layer 15A and the coupling structure 48 is formed in the lower conductive layer 15B.

FIG. 5 also depicts a current/voltage source 50 for feeding an input signal to the dipole elements 12A and 12B. A current/voltage source 52 supplies an input signal to the dipole elements 14A and 14B.

Figure 6:
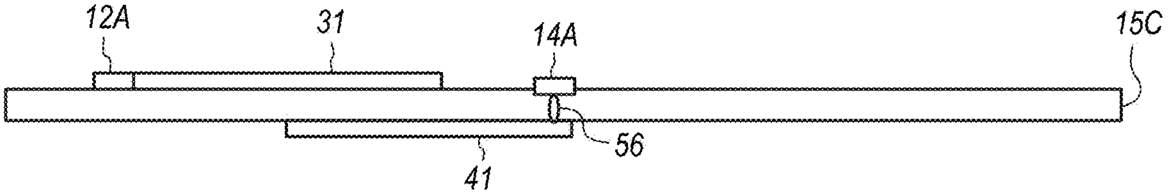

A partial side view of two coupling structures, two dipole elements, and the printed circuit board are illustrated in FIG. 6. A conductive via 56 connects the dipole element 14A to the coupling structure 41. A similar conductive via (not shown in FIG. 6) connects the dipole element 12B formed on the top surface of the printed circuit board to the coupling structure 48 formed in the lower conductive layer 15B of the printed circuit board 15.

Returning to FIG. 5, the coupling structures 41 and 48, which are formed in the lower conductive surface 15B of the printed circuit board are depicted with hash marks in FIG. 5 to distinguish them from the coupling structures 31 and 38 formed in the upper conductive surface 15A.

Figure 7:
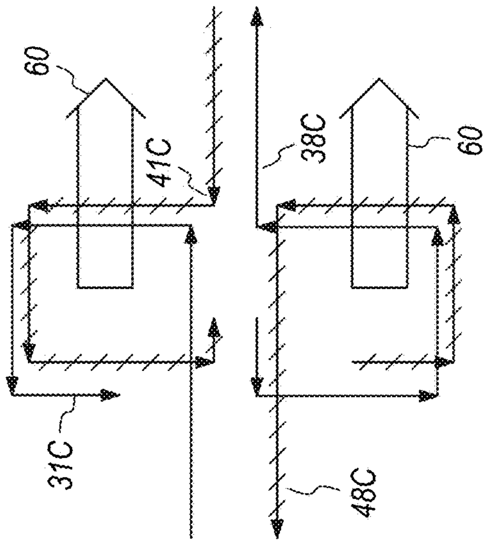
FIG. 7 illustrates current flow rotation through the coupling structures of the present invention and the resulting magnetic field.

The arrowheads in FIG. 7 illustrate the current flow rotation direction for each of the coupling structures 31, 41, 38, and 48, here identified by the corresponding reference numerals 31C, 41C 38C, and 48C. Also, the hash mark notation used in FIG. 5 is carried over to FIG. 7.

The current flow directions illustrated in FIG. 7 generate magnetic fields indicted by double arrowheads 60.

Figure 9:
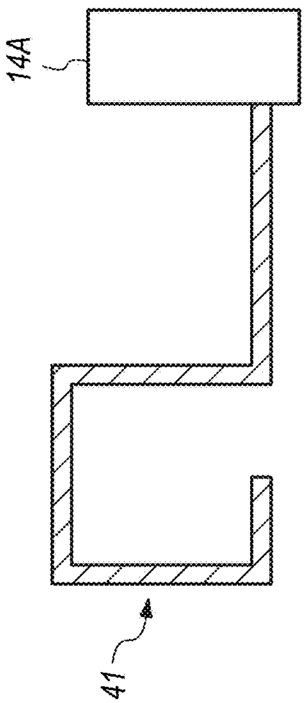
FIGS. 8-11 illustrate the four coupling structures of the present invention. illustrates certain dimensions associated with the coupling structure of the present invention.
Figure 8:
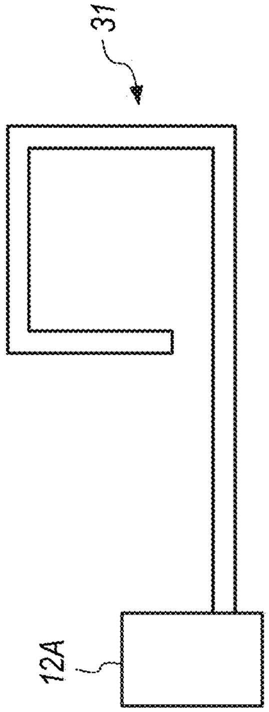

Another illustration of the coupling structures 31 and 41 is shown in FIGS. 8 and 9, respectively. The coupling structure 31 is conductively connected to the dipole element 12A and the coupling structure 41 is conductively connected to the dipole element 14A. As shown in FIGS. 3 and 5, a region of the coupling structure 31 overlies a region of the conductive structure 41.

Figure 10:
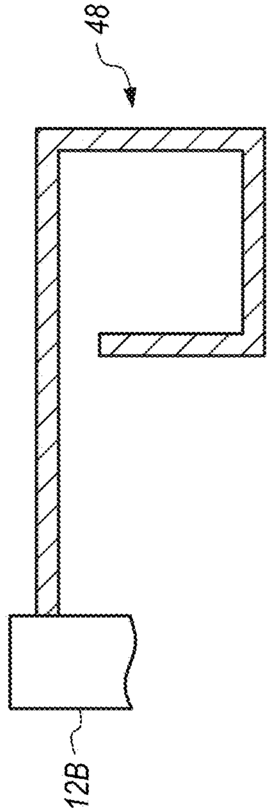
Figure 11:
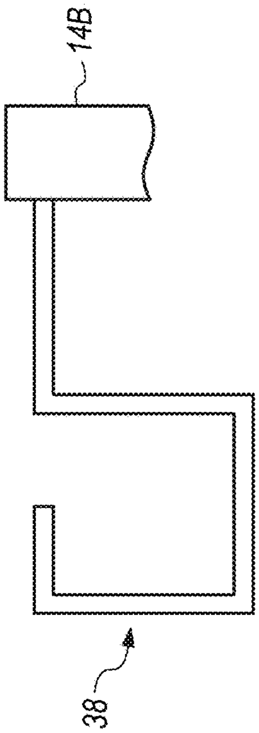

Another illustration of the coupling structures 48 and 38 is shown in FIGS. 10 and 11, respectively. The coupling structure 48 is conductively connected to the dipole element 12B and the coupling structure 38 is conductively connected to the dipole element 14B. As shown in FIGS. 3 and 5, a region of the coupling structure 38 overlies a region of the conductive structure 48.

Note that the cross hatched notation for indicating the coupling structures formed in the lower conductive 15B (see FIG. 4) is also employed in FIGS. 9 and 10.

Although the illustrated embodiment each of the four coupling structures depicts a parallelogram comprising a plurality of piecewise linear segments intersecting at 90 degrees, these are not necessarily required shapes, as in another embodiment the coupling structures comprise curved segments.

Figure 13:
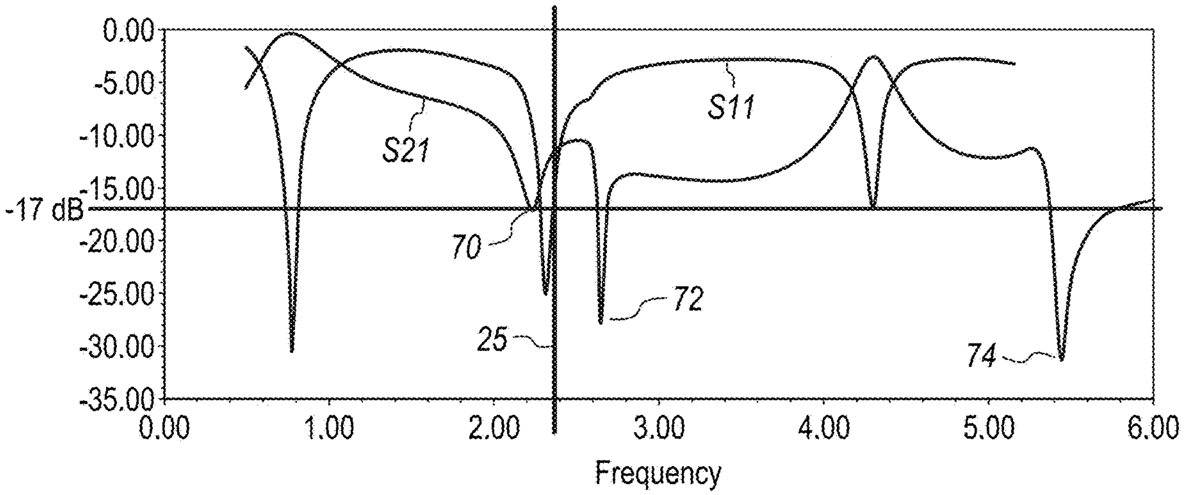
FIG. 13 illustrates frequency response characteristics for the antennas after adding the coupling structures according to the present invention.
Figure 14:
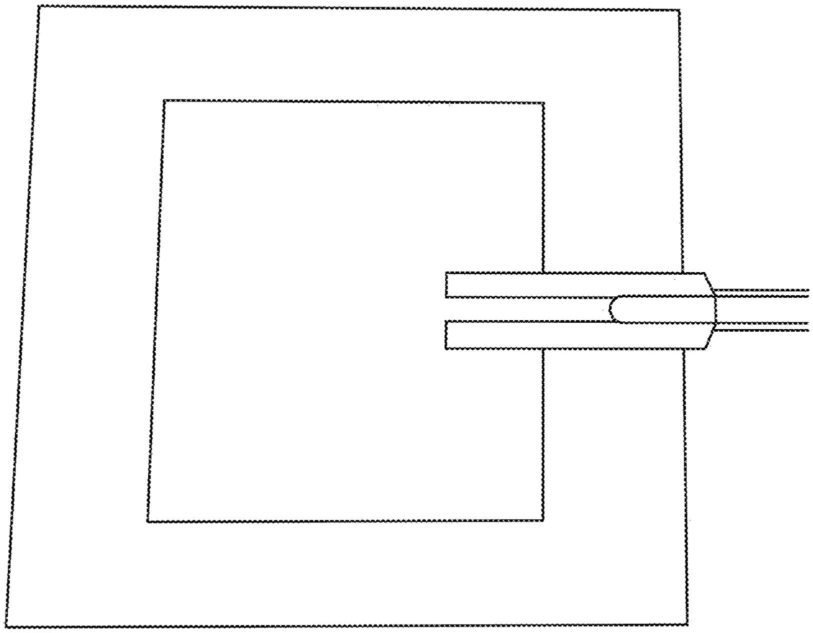
FIG. 14 illustrates a patch antenna to which the teachings of the present invention can be applied.
Figure 15:
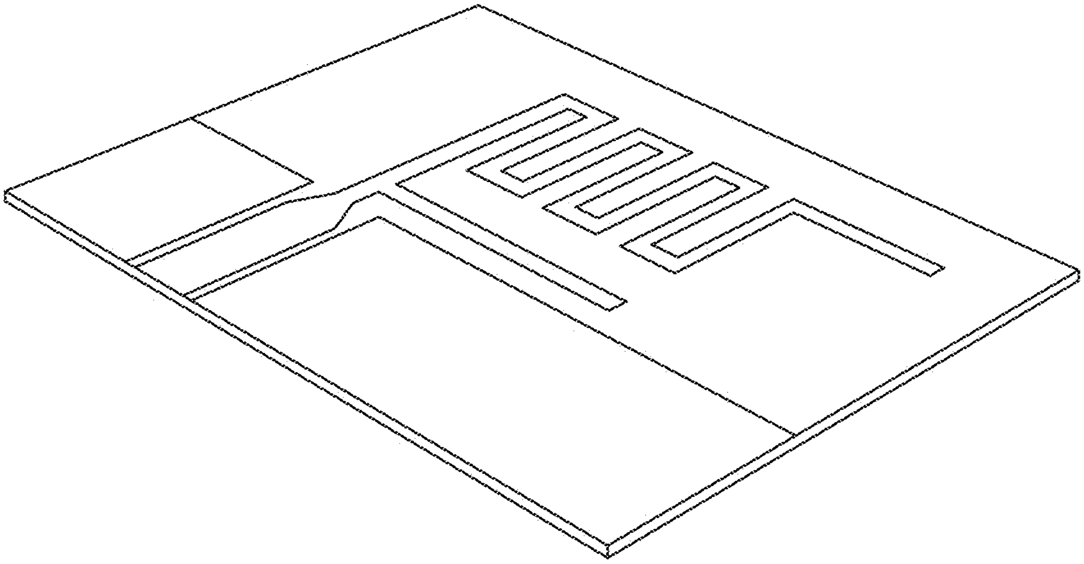
FIG. 15 illustrates a meanderline antenna to which the teachings of the present invention can be applied.
Figure 16:
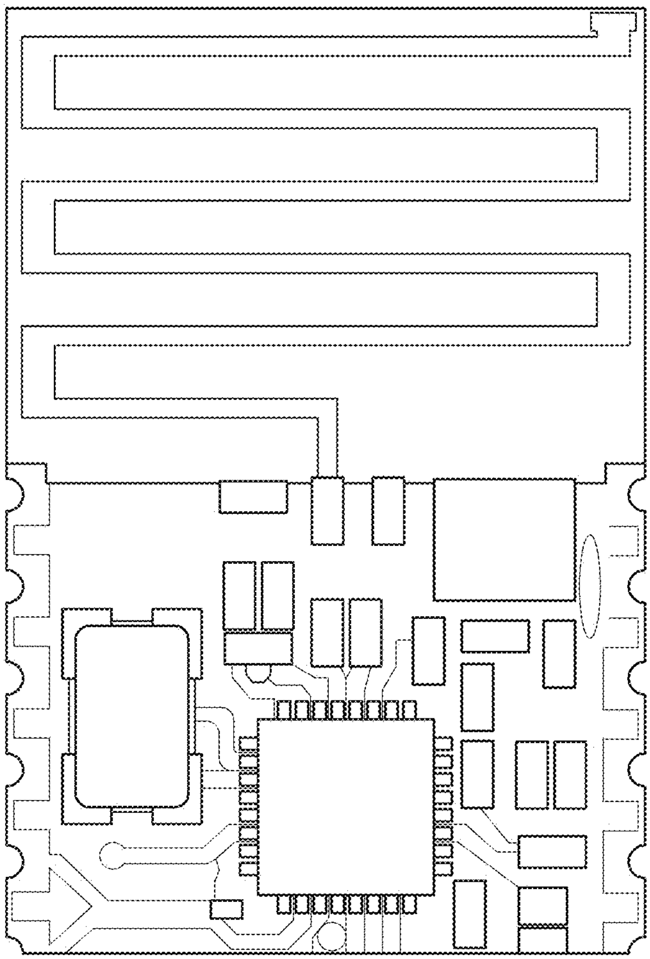
FIG. 16 illustrates a monopole antenna to which the teachings of the present invention can be applied.
Figure 17A:
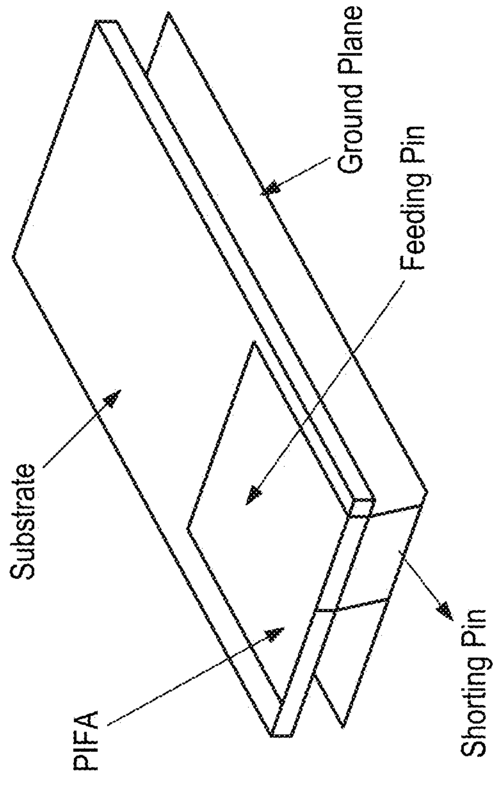
FIGS. 17A and 17B illustrate a PIFA antenna to which the teachings of the present invention can be applied.
Figure 17B:
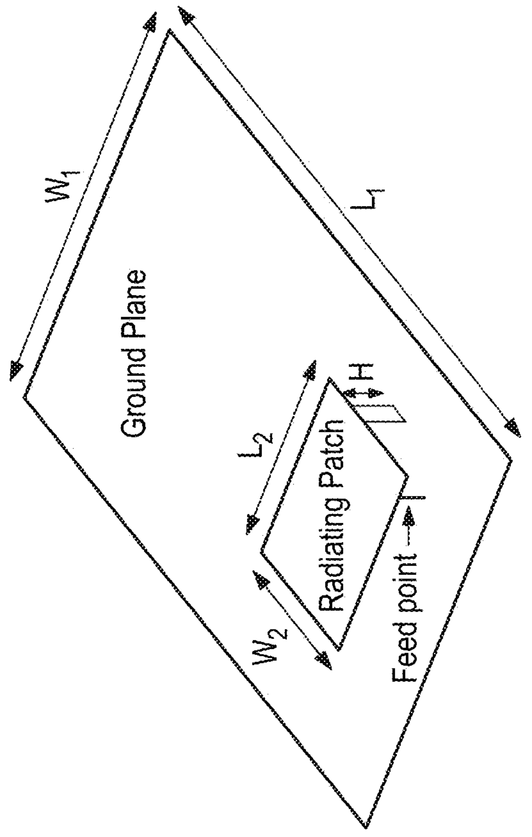

Also, although the present invention has been described in the context of closely-spaced dipole antennas, the advantageous features of the invention can also be applied to closely-spaced patch antennas as in the patch antenna of FIG. 13, to closely-spaced meanderline antennas as in the meanderline antenna of FIG. 14, to closely-spaced monopole antennas as in the monopole antenna of FIG. 15, and to closely-spaced PIFA antennas (planar-inverted F-antennas), as in the PIFA antenna of FIGS. 16A and 16B.

The present invention as set forth herein, discloses specific antenna coupling structures and parameters that can affect antenna performance. Since it is difficult to determine the best parameters to minimize negative coupling, the inventor has determined that an artificial intelligence program provides appropriate parameters that optimize performance of the antenna radiators. During a training process the algorithm identifies relationships between input training data desired outputs and encodes these relationships into a "model," such as a neural network. The trained model is then available to find subtle relationships between inputs similar to those in the training data and identifies an output.

As applied to the present invention, the AI algorithm is trained using data from electromagnetic simulations. The system output identifies parameters (D, G, W, and L) for the coupling structures, thereby improving performance by reducing interference coupling between the radiating elements and thereby maximizing performance of the antenna system.

In a preferred embodiment, an artificial intelligence-based program, as described further below, was executed to determine certain parameters of the coupling structures 31, 38, 41, and 48 to cancel the interfering fields generated by the dipole antennas 12 and 14. Those skilled in the art recognize that it may be difficult to determine the optimum parameters that minimize field interference without the use of an artificial intelligence application.

Figure 12:
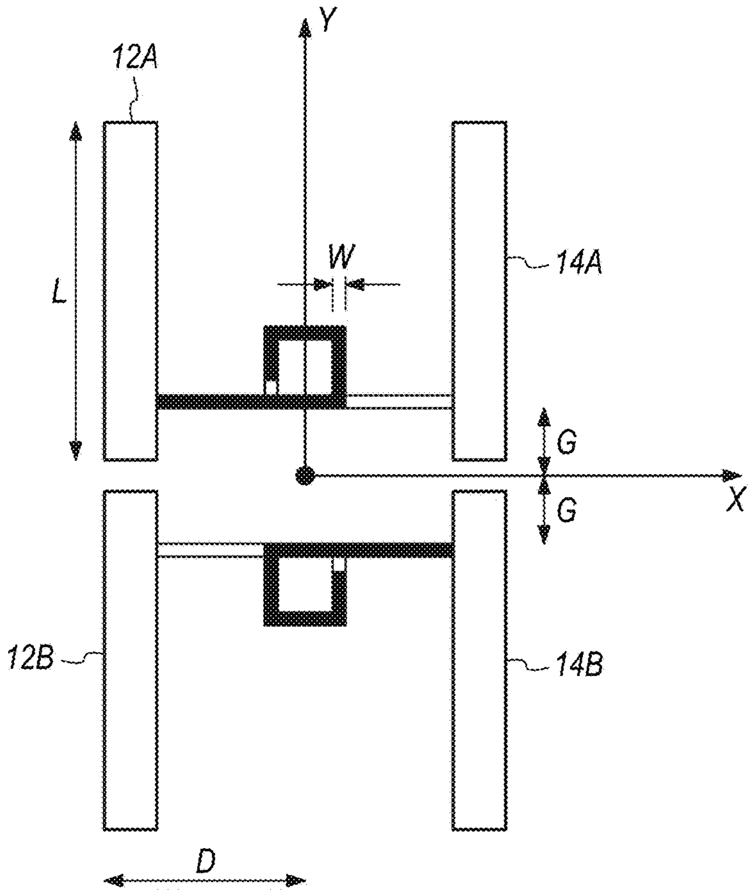
FIG. 12 illustrates certain parameters of the coupling structure of the present invention.

FIG. 12 illustrates certain parameters associated with the four coupling-structures of the present invention as determined by the AI/ML algorithm:

L: length of the radiator

D: half of the distance between the two radiators

G: a location of the coupling structures

W: line width of the coupling structures

FIG. 13 illustrates the improved frequency response of the coupling-controlled antenna system of the present invention, that is, after implementation of the novel and non-obvious coupling structures as defined by the AI-determined parameters set forth above.

By employing the determined coupling structures and thereby reducing the interference between the radiating dipole elements 12A, 12B, 14A, and 14B the antenna isolation parameter $S_{21}$ is improved to −17 dB (from −5 dB without the inventive coupling structure) near the resonant frequency. Isolation between the radiating structures The three peaks in $S_{21}$ labeled 70, 72, and 74 depict isolation in dB between the radiating structures.

Figure 2:
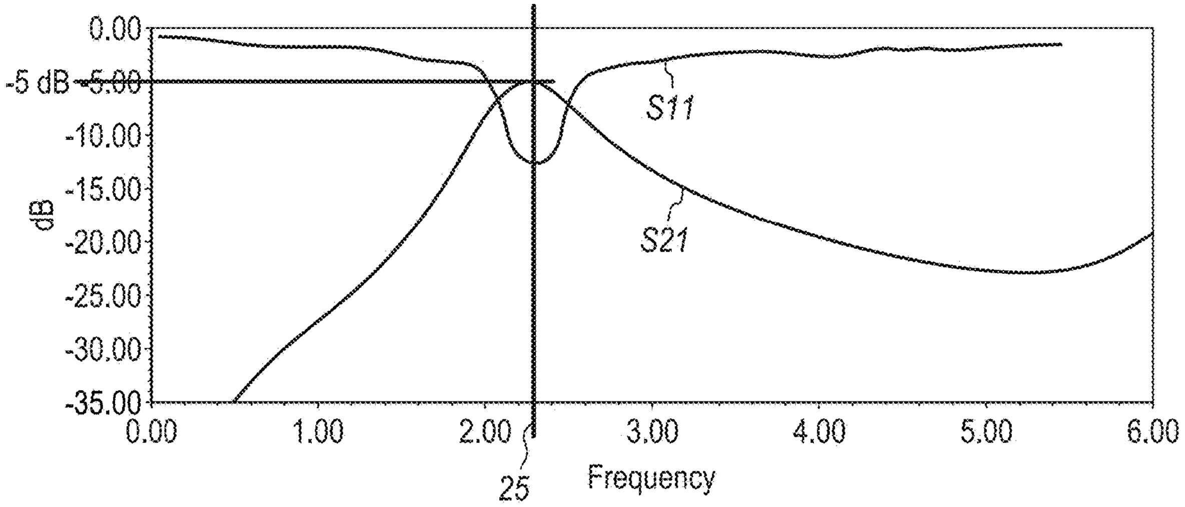
FIG. 2 (Prior Art)
FIG. 2 illustrates two characteristics for the prior art dipole antennas of FIG. 1 as a function of frequency.

Significant improvements in the parameter $S_{11}$ are also apparent. Near the resonant frequency as indicated by the vertical line 25, the $S_{11}$ parameter is at about −25 dB from about −12 dB (See prior art FIG. 2) without coupling structure of the invention.

As determined from computer simulations employing the inventive coupling structures, the radiation efficiency of the two-dipole antenna system also improves with the addition of the novel coupling network, that is from 60% to 73%.

Important features of the present invention include at least the following:

The coupled-controlled antenna system of the present invention comprises first and second dipole antennas, 12A/12B and 14A/14B and four coupling structures 31, 38, 41, and 48 disposed on a two-layer printed circuit board.

In the top printed circuit board layer, the first coupling structure connects to the radiating element of the first antenna and the second coupling structure connects to the ground element of the second antenna.

In the lower conductive printed circuit board layer, the third the coupling structure connects to the radiating element of the second antenna and the fourth coupling structure connects to the ground element of the first antenna.

The coupling structures in the top layer of the printed circuit board are not conductively connected to the coupling structures in the bottom layer.

When implemented with determined values for the parameters D, G, W, and L, each of the coupling structures generates an electromagnetic field that beneficially affects the coupling between the first and second dipole radiators. These coupling structures are designed to minimize field cancelation that is caused by negative coupling, i.e., the opposite directions of each field.

The four coupling structures (i.e., the rectangular shaped lines with open ends) disposed between the two antennas have surface currents that flow in the same direction. Therefore, the radiated fields from each of the structures have the same direction, adding their field energies, while minimizing interference from each of the two antennas connected to the structures. See FIG. 7.

Certain aspects of the invention teach a method for determining parameters of a coupling structures for closely-spaced antennas, especially antennas formed from conductive surfaces of a printed circuit board. The parameters are identified in FIG. 12. In one embodiment, an artificial intelligence (AI)/machine learning (ML) algorithm is employed to determine these one or more parameters of the coupling network of the present invention, including the parameters described herein. In one implementation, the AI/ML algorithm is based on a neural network structure.

The AI/ML methodology can be executed in the context of computer-executable instructions, such as program modules, executed by a computer. Generally, program modules include routines, programs, objects, components, data structures, etc. that perform specific tasks or implement particular abstract data types. These software programs can be coded in different languages, for use with different processing platforms. It will be appreciated, however, that the principles that underlie the optimization process can be implemented with various types of computer hardware and software technologies.

FIGS. 18A, 18B, and 18C depict block diagrams of the training and execution phases of an artificial intelligence system of the present invention for determining the parameters set forth in FIG. 12.

In a training phase illustrated in FIG. 18A, certain curated training parameter values, referred to as D, G, W, and L (with indicated numerical values that were used), that refer to the parameters and dimensions depicted in FIG. 12, are input to an AI deep learning algorithm 80 for refining the algorithm 80 to produce accurate responses based on the input values. The training data was acquired from HFSS electromagnetic simulations. The desired responses as indicated by outputs from the algorithm 80, include frequencies Fr1, Fr2, Fr3, Fi1, and Fi2. By inputting several different values for D, G, W, and L, (from the simulated data) evaluating the results, and adjusting the algorithm to improve the results, the algorithm is "taught" and thereafter can be run to generate more accurate outputs based on input values D, G, W, and L for output frequencies Fr1, Fr2, Fr3, Fi1, and Fi2.

Fr1 is the resonant frequency of the dipole antenna.

Fr2 is also typically a resonant frequency of the dipole or a harmonic of Fr1.

Fr3 is a harmonic frequency of Fr1 or can be a resonant frequency of the dipole.

Fi1 and Fi2 are other resonances associated with the dipole antennas and/or the coupling structures.

Use of the AI process does not require specific knowledge of the cause of these resonant frequencies, only that they exist in the output spectrum. Inputting these frequencies into the trained AI algorithm (as in FIG. 18C) generates values for D, G, W, and L that will reduce interference at the resonant frequencies of the dipole antennas.

FIG. 18B illustrates an alternative training process whereby several curated values of Fr1, Fr2, Fr3, Fi1, and Fi2 are input to train the algorithm to generate more accurate values for D, G, W, and L.

FIG. 18C depicts the trained AI algorithm that generates output values (typically the five frequency values or the four parameter values) based on inputs that represent, conversely, the four parameter values or the five frequency values.

Figure 19:
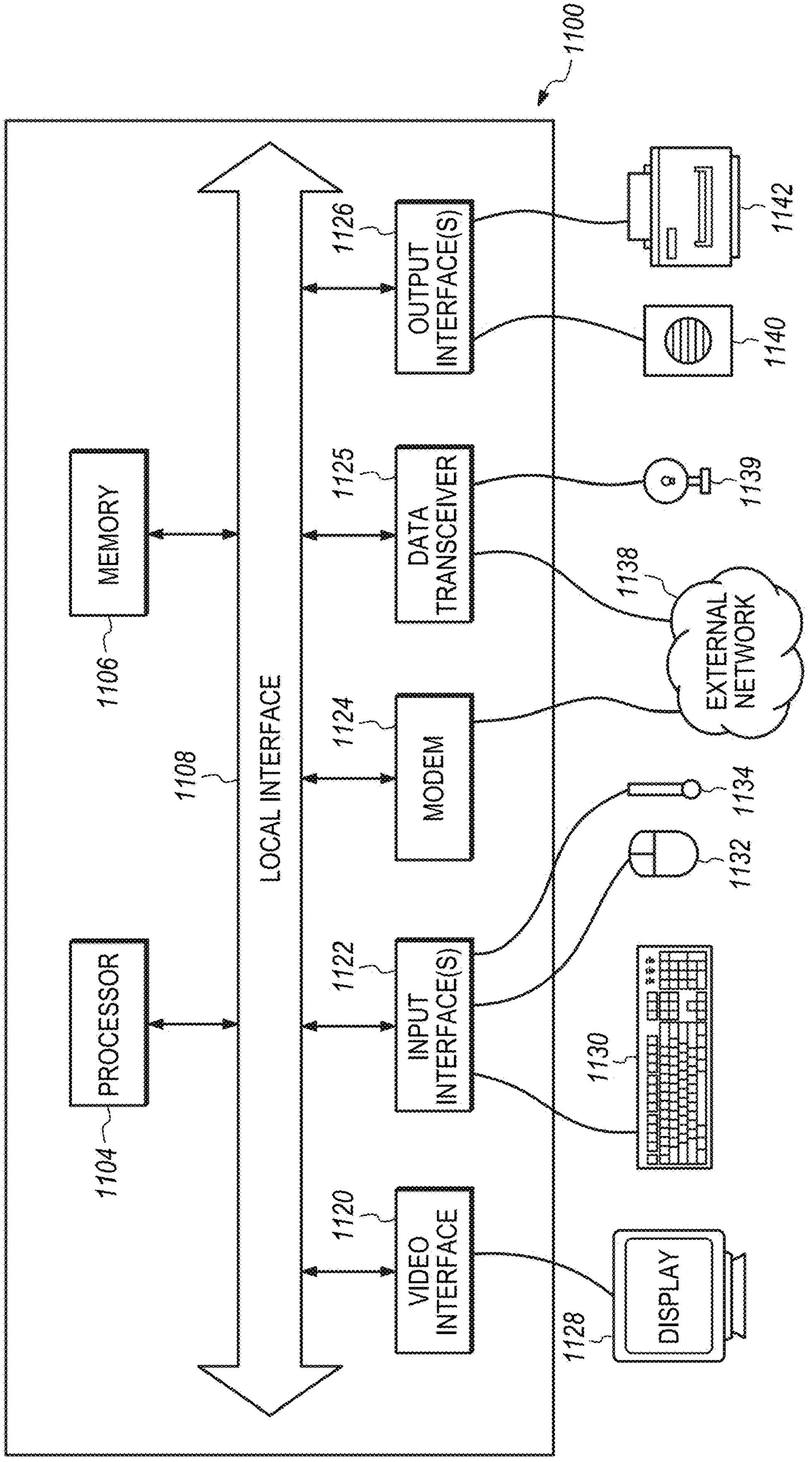
FIG. 19 illustrates a computer system for determining certain dimensions of the coupling structures of the present invention.

FIG. 19 illustrates a computer system 1100 for use in practicing the invention, including training the AI algorithm (FIGS. 18A and 18B) and using the trained AI algorithm (FIG. 18C) to identify values for D, G, W, and L.

The system 1100 can include multiple remotely-located computers and/or processors and/or servers (not shown). The computer system 1100 comprises one or more processors 1104 for executing instructions in the form of computer code to carry out a specified logic routine that implements the teachings of the present invention.

The computer system 1100 further comprises a memory 1106 for storing data, software, logic routine instructions, computer programs, files, operating system instructions, and the like, as is well known in the art. The memory 1106 can comprise several devices, for example, volatile and non-volatile memory components further comprising a random-access memory RAM, a read only memory ROM, hard disks, floppy disks, compact disks including, but not limited to, CD-ROM, DVD-ROM, and CD-RW, tapes, flash drives, cloud storage, and/or other memory components. The system 1100 further comprises associated drives and players for these memory types.

In a multiple computer embodiment, the processor 1104 comprises multiple processors on one or more computer systems linked locally or remotely. According to one embodiment, various tasks associated with the present invention may be segregated so that different tasks can be executed by different computers/processors/servers located locally or remotely relative to each other.

The processor 1104 and the memory 1106 are coupled to a local interface 1108. The local interface 1108 comprises, for example, a data bus with an accompanying control bus, or a network between a processor and/or processors and/or memory or memories. In various embodiments, the computer system 1100 further comprises a video interface 1120, one or more input interfaces 1122, a modem 1124 and/or a data transceiver interface device 1125. The computer system 1100 further comprises an output interface 1126. The system 1100 further comprises a display 1128. The graphical user interface referred to above may be presented on the display 1128. The system 1100 may further comprise several input devices (some which are not shown) including, but not limited to, a keyboard 1130, a mouse 1131, a microphone 1132, a digital camera, smart phone, a wearable device, and a scanner (the latter two not shown). The data transceiver 1125 interfaces with a hard disk drive 1139 where software programs, including software instructions for implementing the present invention are stored.

The modem 1124 and/or data receiver 1125 can be coupled to an external network 1138 enabling the computer system 1100 to send and receive data signals, voice signals, video signals and the like via the external network 1138 as is well known in the art. The system 1100 also comprises output devices coupled to the output interface 1126, such as an audio speaker 1140, a printer 1142, and the like.

This Description of the Invention is not to be taken or considered in a limiting sense, and the appended claims, as well as the full range of equivalent embodiments to which such claims are entitled define the scope of various embodiments. This disclosure is intended to cover any and all adaptations, variations, or various embodiments. Combinations of presented embodiments, and other embodiments not specifically described herein by the descriptions, examples, or appended claims, may be apparent to those of skill in the art upon reviewing the above description and are considered part of the current invention.

What is claimed is:

1. An antenna system comprising:

a printed circuit board comprising an insulator layer disposed between an upper and a lower conductive layer;

first and second spaced-apart antennas each comprising a first element formed in the upper conductive layer and a second element formed in the lower conductive layer:

a first coupling structure disposed in the upper conductive layer and conductively connected to the first element of the first antenna;

a second coupling structure disposed in the lower conductive layer and conductively connected to the first element of the second antenna;

a third coupling structure disposed in the lower conductive layer and conductively connected to the second element of the first antenna;

a fourth coupling structure disposed in the upper conductive layer and conductively connected to the second element of the second antenna;

wherein a region of the first coupling structure overlies a region of the second coupling structure;

wherein a region of the fourth coupling structure overlies a region of the third coupling structure; and wherein current flow directions in the first, second, third, and fourth coupling structures reduces interference between a first electromagnetic field radiated from the first antenna and a second electromagnetic field radiated from the second antenna.

2. The antenna system of claim 1, wherein the first, second, third, and fourth coupling structures are disposed between the first and the second antennas.

3. The antenna system of claim 1, wherein electromagnetic fields radiated from the first, second, third, and fourth coupling structures reduce interference between the first and second electromagnetic fields.

4. The antenna system of claim 1, wherein parameters of each one the first, second, third, and fourth coupling structures comprise a dimension of the first and second antennas, one-half of a distance between the first and second antennas, location of the first, second, third, and fourth coupling structures relative to a location of the first and second antennas, and a line width of the first, second, third, and fourth coupling structures.

5. The antenna system of claim 1, wherein parameters of each one the first, second, third, and fourth coupling structures comprise a length of each one of the first, second, third, and fourth coupling structures.

6. The antenna system of claim 5, wherein the first antenna comprises a first dipole antenna further comprising first and second dipole elements, and the second antenna comprises a second dipole antenna comprising third and fourth dipole elements, wherein a parameter of each one of the first, second, third, and fourth couple structures comprises a length of the first and third dipole elements.

7. The antenna system of claim 1, wherein the first, second, third, and fourth coupling structures have a same length.

8. The antenna system of claim 1, wherein the first and second antennas each comprise a monopole antenna, a PIFA antenna, a patch antenna, or a meanderline antenna.

9. The antenna system of claim 1, wherein a shape of each one of the first, second, third, and fourth coupling structures comprises a plurality of coupled linear segments or a plurality of coupled curved segments.

10. The antenna system of claim 1, wherein a shape of each one of the first, second, third, and fourth coupling structures comprises an open parallelogram or an open spiral.

11. The antenna system of claim 10, wherein the open parallelogram of each one of the first, second, third, and fourth coupling structures each comprises four linear segments, and wherein each one of the four linear segments is connected to an adjacent linear segment at a right angle.

12. The antenna system of claim 1, wherein magnetic fields generated by current flow through each of the first, second, third, and fourth coupling structures are in a same direction.

13. The antenna system of claim 1, wherein each one of the first and fourth coupling structures comprises a conductive trace formed in the upper conductive layer and each one of the second and third coupling structures comprises a conductive trace formed in lower conductive layer.

14. The antenna system of claim 1, wherein the first, second, third, and fourth coupling structures increase field isolation between fields radiated from the first and second antennas.

15. The antenna system of claim 1, wherein the first, second, third, and fourth coupling structures reduce a value of $S_{21}$ or a value of $S_{12}$ at one or more frequencies for the first and second antennas.

16. The antenna system of claim 1, wherein the first, second, third, and fourth coupling structures reduce interference between electromagnetic fields generated by the first and second antennas at one or more of the resonant frequencies of the first and second antennas.

17. A system for reducing interference between electromagnetic signals generated by a first and a second closely-spaced antennas, the system comprising:

a processor configured to execute a process;

a memory for storing the process and for storing features associated with the first and second antennas;

a device for receiving parameters related to interference between the electromagnetic signals generated by the first and second antennas;

the process, when executed operable to:

receive the parameters related to interference;

analyze the parameters using a trained machine learning algorithm; and generate an output comprising parameters for one or more coupling structures and parameters for locating the coupling structures relative to a location of the first and second antennas.

18. The system of claim 17, wherein the one or more coupling structures comprise four coupling structures and the parameters for each one of the four coupling structures comprise one or more of: an electrical length of the first and second antennas, location of each one of the four coupling structures relative to a location of the first and second antennas, a line width of each one of the four coupling structures, and a length of each one of the four coupling structures.

19. A non-transitory computer-readable storage medium embodying instructions that, when executed by at least one processor, cause the processor to perform operations related to determining parameters for one or more coupling structures, the operations comprising:

identifying interference characteristics between electromagnetic fields produced by a first and a second antenna, wherein the first and the second antenna are located in proximate relation;

inputting into a trained machine learning algorithm the interference characteristics;

analyzing the interference characteristics using the trained machine learning algorithm; and the trained machine learning algorithm identifying parameters for one or more coupling structures to be placed proximate the first and second antennas to reduce the interference characteristics.

20. The non-transitory computer-readable storage medium of claim 19, wherein the one or more coupling structures comprise four coupling structures, and wherein parameters of each one of the four coupling structures comprise one or more of, an electrical length of each one of the first and second antennas, location of each one of the four coupling structures relative to a location of the first and second antennas, a line width of each one of the four coupling structures, and a length of each one of the four coupling structures.

* * * * *